United States Patent Office 2,953,497
Patented Sept. 20, 1960

2,953,497
THERAPEUTIC TABLETS

Howard A. Press, Bronx, N.Y.
(54 Tenafly Road, Tenafly, N.J.)

No Drawing. Filed June 3, 1953, Ser. No. 359,421

1 Claim. (Cl. 167—82)

This invention relates to shaped medicinal preparations, such as tablets, and it has particular relation to shaped medicinal preparations comprising particles or granules of two or more kinds having different dispersion times in the system of the patient. The term "dispersion time" or "dispersion period" is used in the present specification and claim to denote the time necessary for dispersion or dissolution in the patient's system after administration.

The main object of the present invention is to provide shaped medicinal preparations such as tablets, which are composed of granules of at least two kinds, which require different periods of time for being dispersed or dissolved in the system of the patient upon administration per os or by absorption.

Another object of the present invention is to provide shaped medicinal preparations, the granules of which are dispersed or dissolved gradually during an extended period of time in the system of the patient, in order to extend action of the preparation over such predetermined period of time.

A further object of the invention consists in providing shaped medicinal preparations which contain granules differing, on the one hand, in their therapeutically active ingredients and, on the other hand, in their dispersion periods, so that by administration of a single tablet, two or more therapeutically active ingredients can be brought to action in the system of the patient at different times.

It is also an object of the present invention to provide moldable medicinal compositions comprising at least two kinds of granules having different dispersion periods, if desired in mixture with a solid diluent for protecting the granules during conversion of the moldable composition into shaped tablets or the like, under pressure.

Still another object of the present invention is to provide a process for preparing moldable medicinal compositions, and shaped medicinal products of the above mentioned type.

Other objects and the advantages of the invention will be apparent from the appended claim and the following specification, which describes by way of example and without limitation, some embodiments of the invention.

In carrying out the present invention, granules consisting for example of sugar and corn starch and granulated with corn syrup are prepared in a coating pan with the application of heat. For example, 95 parts of sucrose and 5 parts of corn starch, both finely powdered, are homogeneously mixed and then placed in a revolving coating pan. 30° Bé. corn syrup is slowly added for granulation while the mixture is heated to about 180° F. The material is allowed to soften, but not to melt or char, thus allowing the granules to round out smoothly. The material is then sifted through a #12 sieve until all material is granulated. Larger granules are reduced to fine powder and the process is repeated until the desired quantity of granules of desired size is obtained.

The desired total amount of granules is divided into the number of batches desired preparatory to the addition of the therapeutically active ingredients and the protective coatings.

The therapeutically active ingredients are used in form of solutions containing a minimum amount of solvent, for example acetone, alcohol, chloroform or water. The solution is divided into as many parts as the number of batches. The solutions of the therapeutically active ingredients may be introduced into the uncoated granules. Or said solutions may be applied to the granules between the first and last coating thereof, for example, with shellac and/or cellulose acetate phthalate.

Another procedure for preparing the granules used in carrying out the present invention, consists in homogeneously mixing 1 part by weight of the active ingredient with a minimum of 2 parts of powdered sucrose, and 5–10 parts of corn starch, and granulating the mixture with corn syrup, in the manner described above. The finished granules are then divided into batches and each batch is subjected to coating for example with shellac and/or cellulose acetate phthalate solutions of different concentration and/or composition in order to form granules having different disintegration periods.

In the preparation of tablets which contain only granules consisting of the same therapeutically active ingredients, a single batch can be prepared and converted into granules in conventional manner. Prior to further treatment, this batch of granules is divided into two or more portions, which are then treated separately by coating and/or impregnation with different solutions of a binder. Said solutions may contain the same binder in different concentrations or may contain different binders. The granules are now allowed to dry until they lose their cohesive properties, but are not entirely dry and brittle yet, and are then compressed to the desired shape and weight, preferably after being mixed with a solid diluent for protecting the granules from being crushed during compression, and preferably under air-conditioning.

In carrying out the present invention, two or more ingredients, or two or more mixtures of ingredients can be combined in the form of granules in the same tablet, and the invention makes it possible to control the period of time, in which each of the ingredients or mixtures present in the granules, is released into the system of the patient. Thus, the rate of release of one or more ingredients, or mixtures of ingredients, can be adjusted in any desired predetermined manner.

For example, according to the invention, a 10 mg. tablet can be prepared, 1 mg. of which is released each hour upon administration of one tablet per os. This is done by first preparing one batch of granules of uniform composition and then dividing the granules into ten batches and providing them with different coatings, such as different combinations of bees wax, shellac and cellulose acetate solutions, or with coatings of different thickness of the same binder, used in solutions of different concentration. Thus, 10 batches of granules are separately prepared to withstand the dispersing or dissolving action of the patient's organism for from 1 to 10 hours. The finished batches are mixed in suitable combinations to make up the desired strength, mixed with a sufficient amount of diluents, such as granulated sucrose, lactose, calcium carbonate, etc. for supporting and protecting the granules from being crushed, during their compression to tablets. Tablets comprising ingredients which could not be mixed in the same tablet according to known procedures, due to incompatibilities, such as aspirin and antihistamines, without buffering, can be likewise combined in the same tablet according to the present invention.

The following examples illustrate some embodiments of the invention, to which the invention is not limited.

*Example 1*

|  | Gm. |
|---|---|
| (a) Thiamine hydrochloride | 120 |
| (b) Ascorbic acid | 60 |
| (c) Riboflavin | 60 |
| (d) Powdered lactose | 60 |

The finely powdered ingredients (a), (b), (c), (d) are homogeneously mixed and to the resulting powder mixture a moistening liquid, such as the solution of a binder, for example mucilage of acacia, in alcohol, water or acetone is added in order to cause particles of the powder to adhere. After drying, the mixture is sifted through a #12 sieve in order to convert the mixture into granules of substantially uniform size.

The granules are now divided into two batches and each batch is coated with a solution of cellulose acetate phthalate in acetone. One batch is treated with a 20% and the other with a 40% solution of cellulose acetate phthalate. These solutions are added slowly and with continuous mixing to the granules, which are then allowed to dry until they have lost their cohesive properties. 50 parts by weight of the granules coated with the 20% solution and 50 parts by weight of the granules coated with the 40% solution are mixed with 100 parts by weight of a diluent consisting of granulated lactose and the mixture formed is compressed to tablets of 500 mg. in a tabletting machine, preferably under air-conditioning.

*Example 2*

|  | Mg. |
|---|---|
| (a) Acetysalicylic acid | 210 |
| (b) Acetophenetidin | 150 |
| (c) Caffeine | 30 |
| (d) Phenobarbital | 15 |

The above ingredients are mixed in a finely powdered form to a uniform mixture, and precompressed into discs, which are subsequently broken and passed through a sieve #14.

The granules thus obtained are divided into three portions which are then separately treated with different coating solutions.

The first portion is treated with a 10% solution of cellulose acetate phthalate in carbon tetrachloride. The second portion is treated with a 20% solution of cellulose acetate phthalate in carbon tetrachloride and the third portion is treated with a 40% solution of cellulose acetate phthalate in carbon tetrachloride.

The first, second and third portion thus coated are mixed after drying with each other and with a diluent consisting of granulated lactose in the following proportions:

|  | Parts by weight |
|---|---|
| First portion | 30 |
| Second portion | 30 |
| Third portion | 30 |
| Diluent | 10 |

The resulting mixture is compressed to tablets of 450 mg. in conventional manner.

*Example 3*

Aspirin is granulated by mixing it with a solution of 2 g. of "Carbowax-6000" in 30 cc. of carbon tetrachloride and pressing the moist mass through a #10 sieve. A second batch of granules is prepared by mixing aspirin with the before mentioned Carbowax solution and pressing the moist mass through a #14 sieve. After drying, the granules of this second batch are coated by treating them with a 20% solution of cellulose acetate phthalate in carbon tetrachloride and drying the coated granules until they lose their cohesive properties.

25 parts by weight of the uncoated aspirin granules are now mixed with 25 parts by weight of the second batch of granules and with 50 parts by weight of a diluent consisting of granulated lactose. The mixture thus formed is subjected to tabletting to tablets of 300 mg. in conventional manner.

*Example 4*

A batch of granules is prepared in the above described manner from sucrose and corn starch, and the uncoated granules are mixed with the therapeutically active ingredients by impregnating the granules with a solution of the latter.

The batch is then divided into 10 portions, each of which is provided with a different coating. The proportion by weight of the coatings and the disintegration periods of the granules and locations are shown in the following table:

| Batch No. | Percent Shellac | Percent Cellulose Acetate Phthalate | Period of Disintegration | Location |
|---|---|---|---|---|
| 1 | 0.001 |  | 0-60 minutes | Stomach. |
| 2 | 0.002 |  | 60-120 minutes. | Do. |
| 3 | 0.003 |  | 2-3 hours | Do. |
| 4 | 0.001 | 0.05 | 3-4 hours | Small Intest. |
| 5 | 0.002 | 0.05 | 4-5 hours | Do. |
| 6 | 0.003 | 0.05 | 5-6 hours | Do. |
| 7 | 0.004 | 0.05 | 6-7 hours | Do. |
| 8 | 0.005 | 0.05 | 7-8 hours | Do. |
| 9 | 0.006 | 0.05 | 8-9 hours | Do. |
| 10 | 0.007 | 0.05 | 9-10 hours | Large Intest. |

The above table shows that the increasing proportions of the coating materials result in longer disintegration periods.

It will be understood that this invention is not limited to the specific therapeutically active substances, coating materials, granulation processes, and other details specifically described above and can be carried out with various modifications. For example, granules of any other therapeutically active substances, vitamins, antibiotics, hormones, sleeping drugs, and any desired combinations of therapeutically active substances, can be combined to single tablets according to the invention. Instead of the above mentioned coating materials, other coating or impregnating materials such as shellac, keratin, collodion, can be used. The individual graunles present in a tablet may consist of the same therapeutically active ingredients and differ only in the time required for their dispersion or dissolution or of 2 or more kinds of granules, each kind of which contains different therapeutically active substances, which likewise differ in their dispersion periods. The presence of a small amount of a lubricant, such as magnesium stearate, in the compositions to be shaped to tablets is of advantage in many cases. For example, equal weights of coated granules and of granules of sucrose or lactose, serving as diluent, and 2% by weight of magnesium stearate are mixed and the mixture is tabletted under pressure. The shaped preparations according to the invention can be administered per se or by absorption through a mucous membrane. These and other modifications can be made without departing from the scope of the invention as defined in the appended claim.

The term "disintegration period" is used in the present specification and claim to denote the average period of time within which disintegration of the tablets according to the present invention takes place in the system of the patient.

What is claimed is:

A preparation shaped under compression, comprising at least two groups of therapeutically active granules in which the granules of each group contain a medicinal ingredient and a coating providing a different dissolution time for each group of granules, said granules per se being incapable of tabletting under normal tabletting pressure without destroying said coatings, said granules being in mixture with a solid diluent for protecting said coatings from disruption due to tabletting pressure during shaping of the preparation, said granules resuming their original appearance with coatings intact after the diluent is dissolved.

References Cited in the file of this patent

UNITED STATES PATENTS

| | | |
|---|---|---|
| 2,146,867 | Welin | Feb. 14, 1939 |
| 2,738,303 | Blythe | Mar. 13, 1956 |

FOREIGN PATENTS

| | | |
|---|---|---|
| 285,091 | Great Britain | June 10, 1929 |
| 109,438 | Australia | Dec. 22, 1939 |